Jan. 22, 1924.
P. V. MORGAN
SAW CLAMP
Original Filed Feb. 21, 1922
1,481,728
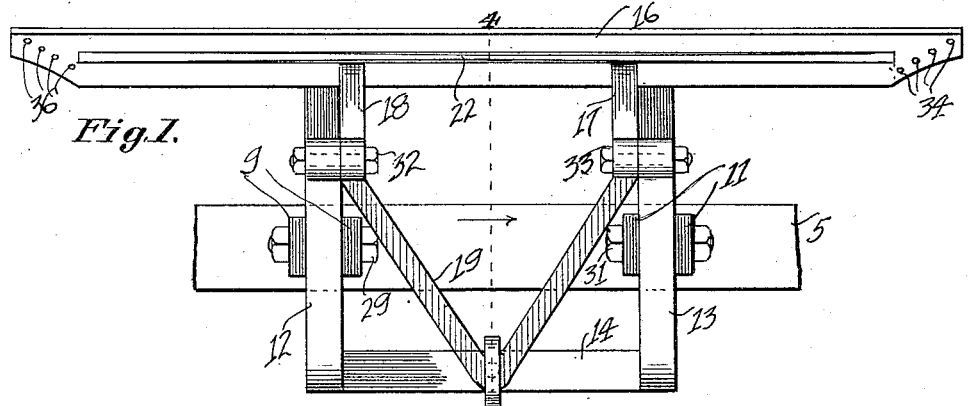
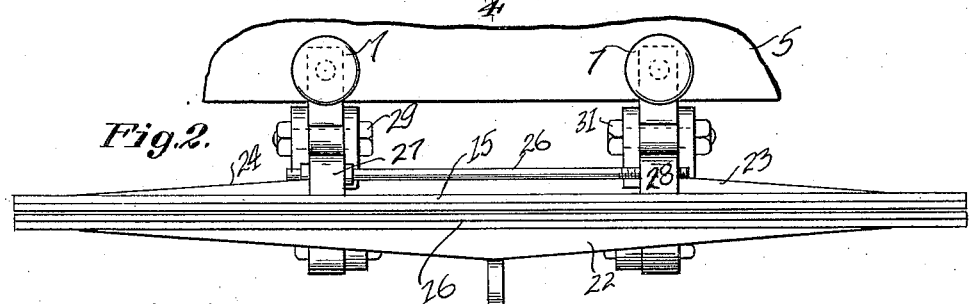
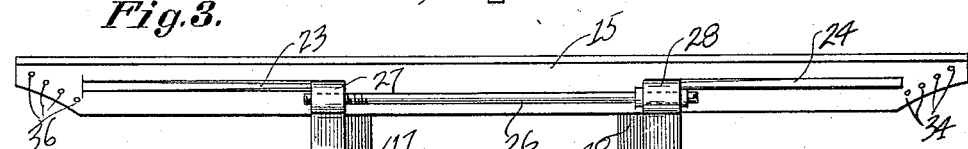
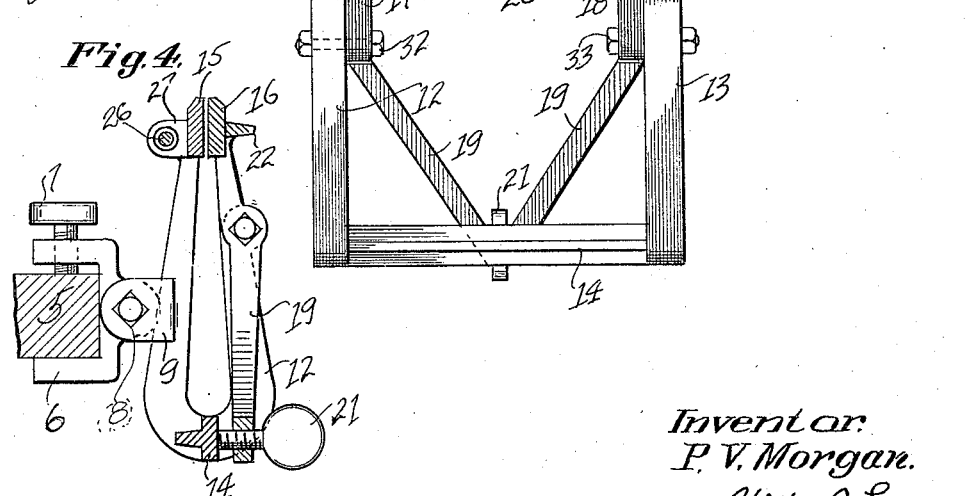
Inventor:
P. V. Morgan.
By Victor J. Evans
attorney.

Patented Jan. 22, 1924.

1,481,728

UNITED STATES PATENT OFFICE.

PURLEY V. MORGAN, OF STOCKTON, CALIFORNIA, ASSIGNOR OF ONE-FIFTH TO JOHN A. OLSEN, OF STOCKTON, CALIFORNIA.

SAW CLAMP.

Application filed February 21, 1922, Serial No. 538,327. Renewed December 5, 1923.

*To all whom it may concern:*

Be it known that I, PURLEY V. MORGAN, a citizen of the United States, residing at Stockton, in the county of San Joaquin, and State of California, have invented new and useful Improvements in Saw Clamps, of which the following is a specification.

This invention relates to improvements in saw clamps adapted for use in holding saws while dressing, filing or sharpening the teeth thereof.

The principal object of this invention is to produce a device of the character described adapted to firmly grip the saw blade throughout its length to thus effectively aid the operator in the sharpening operation.

Other objects are to provide means associated with the clamp which renders the same steady so that when applied to a bench all vibration of the clamp is overcome; to provide adjustable means for the clamp for permitting the positioning of the saw therein at various angles to thus provide the proper reflection of light on the teeth to readily ascertain when the proper degree of filing has been accomplished.

Another object is to produce a clamp which will hold the saw against vibration while being sharpened, thereby eliminating the shrill re-sharpening noise which is so objectionable in saw filing.

A further object is to produce a clamp which is simple in construction, economical to manufacture, strong, durable and highly efficient in use.

Other objects and advantages will be apparent during the course of the following description.

In the accompanying drawings forming a part of this specification, and in which like numerals are employed to designate like parts throughout the same.

Fig. 1 is a side elevation of my invention attached to a table top,

Fig. 2 is a top plan view of Figure 1,

Fig. 3 is a rear elevation of my saw clamp, and

Fig. 4 is a cross section taken on the line 4—4 of Fig. 1.

In the filing of a saw the saw is placed between the jaws which are brought together in order to clamp the saw throughout a substantial length. Heretofore, as far as applicant is aware all saw clamps have been so constructed that they spring, thereby clamping the saw adjacent the ends only, or in the middle and not at the ends, with the result that considerable chattering has been caused while the saw was being filed this chattering causing noises objectionable to the operator and at the same time the proper filing of the saw could not be accomplished. I propose to eliminate this disadvantage by providing jaws which are reenforced and adjustable thereby maintaining the jaws in perfect alignment at all times and in contact with the saw through its gripped length.

In the accompanying drawings wherein for the purpose of illustration is shown a preferred embodiment of my invention, the numeral 5 designates the top of a table. It is obvious, however, that this might be the top of a saw horse or any other convenient support to which a clamp such as shown in Figure 4 could be attached. This clamp consists of a U shaped frame 6 having a set screw 7 which is adapted to engage the surface of the table or other supporting object, it being understood that there are two such clamps as is shown in Figure 2. These clamps are each provided with a wing 8 which are adapted to be positioned between lugs 9 and 11 formed upon the U shaped members 12 and 13. These U shaped members are connected at their bottom by a T shaped connecter 14. A jaw 15 having a cross section best shown in Fig. 4 is formed integral with one of each of the legs of the U shaped members 12 and 13. A similar shaped jaw 16 is formed integral with two downwardly extending portions 17 and 18. These downwardly extending portions are hinged to the U shaped members 12 and 13 and are connected one to the other as by a V shaped member 19 formed integral therewith, which V shaped member carries a screw 21 at its free end, the end of which screw is adapted to contact the connecting base 14. By referring to Fig. 2 it will be noted that the jaw 16 is provided throughout its length with a web 22 which web serves to prevent any longitudinal distortion. The jaw 15 is provided with short webs 23 and 24 at its outer end with a rod 26 connecting lugs 27 and 28 formed integral with the jaw 15.

The operation of my device is as follows

The clamps 6 are placed over the support and the screws 7 brought in contact with the surface of the support in order that the clamp may be rigidly held thereon. The bolts are then placed through the lugs 9 and 11 so that they will engage the wing 8 carried upon each of the clamps. These bolts are shown at 29 and 31. The rod 26 is screwed into one of the lugs such as the lug 27 and an adjusting nut at the opposite end of the said rod is placed thereon. A saw is now placed between the jaws 15 and 16 and the said screw 21 turns so as to contact the cross piece 14. This causes the jaw 16 to pivot on the bolts 32 and 33 and to clamp the saw firmly. by now turning the rod 26, the lugs 27 and 28 may be moved toward or away from each other thereby warping the jaw 15 in order to bring it into parallel line with the jaw 16. Should the operator be filing a band saw or any saw which is extremely narrow, pins may be placed in the openings 34 and 36 so that the narrow saw may rest thereon, the opening used depending upon the web of the saw.

From the foregoing description taken in connection with the accompanying drawing it will be seen that I have provided a clamp which will engage a saw throughout its entire length hold the same rigidly and one which may be tipped on said hinged support for angularly filing or for observation.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a saw clamp, the combination of U shaped members, a jaw pivoted to one leg of each of said members, a V shaped member attached to said pivoted jaw, a cross member connecting said U shaped members, a screw in said V shaped member, said screw being adapted to contact said cross member and reenforcing means formed integral with each of said jaws for the purpose of preventiong distortion thereof.

2. In a device of the character described, the combination with clamps, of a U shaped member pivoted to each of said clamps, a member extending between said U shaped members, jaws carried at the ends of said U shaped members, one of said jaws being moved to and away from the other of said jaws, said movable jaw having a reenforcing web throughout its length, the other of said jaws having a reenforcing web extending throughout a portion of its extremities, lugs formed on said jaw and a rod connecting said lugs, said rod being adapted to move said lugs toward and away from each other for the purpose of aligning the said jaw with said movable jaw.

In testimony whereof I affix my signature.

PURLEY V. MORGAN.